United States Patent [19]

Elfers

[11] 4,230,599
[45] Oct. 28, 1980

[54] PROCESS FOR INHIBITING FOAMING UTILIZING MALEIC ESTER COPOLYMER BASED DEFOAMERS, AND DEFOAMED COMPOSITIONS

[75] Inventor: Gunther H. Elfers, Grosse Ile, Mich.

[73] Assignee: The Diversey Corporation, Northbrook, Ill.

[21] Appl. No.: 970,263

[22] Filed: Dec. 18, 1978

[51] Int. Cl.$^2$ .................. B01D 19/04; C09K 3/00
[52] U.S. Cl. .................. 252/321; 162/169; 162/173; 252/358
[58] Field of Search .................. 252/321, 358

[56] References Cited

U.S. PATENT DOCUMENTS

| | | | |
|---|---|---|---|
| 2,615,843 | 10/1952 | Giammaria | 252/33.4 |
| 2,704,277 | 3/1955 | Giammaria | 252/56 R |
| 2,866,775 | 12/1958 | Sellers | 526/15 |
| 3,296,131 | 1/1967 | Knecht, Jr. | 252/35 |
| 3,388,106 | 6/1968 | Muskat | 526/15 |
| 3,515,575 | 6/1970 | Arnold | 252/358 |
| 3,530,101 | 9/1970 | Haynes et al. | 526/15 X |
| 3,697,440 | 10/1972 | Lichtman et al. | 252/321 |
| 3,705,859 | 12/1972 | Boylan | 252/358 X |
| 3,730,894 | 5/1973 | Heilweil et al. | 252/16 |
| 3,755,264 | 8/1973 | Testa | 526/15 |
| 3,784,586 | 1/1974 | Thomas et al. | 260/861 |
| 3,793,223 | 2/1974 | Lichtman et al. | 252/358 |
| 3,821,069 | 6/1974 | Wurzburg | 162/158 |
| 3,968,005 | 7/1976 | Wurzburg | 162/158 |
| 4,024,072 | 5/1977 | Shane et al. | 252/358 |

*Primary Examiner*—Richard D. Lovering
*Attorney, Agent, or Firm*—Merriam, Marshall & Bicknell

[57] ABSTRACT

This invention relates to defoamed compositions and processes for inhibiting foaming in a liquid system containing water. Maleic ester copolymers in admixture with a mineral oil are particularly useful in pulp and paper manufacturing applications. The defoamers of the invention are compositions comprising mineral oil and a polymer which is an alkyl ester of the reaction product of a maleic compound and a monoethylenically unsaturated monomer copolymerizable therewith. The alkyl ester has the formula:

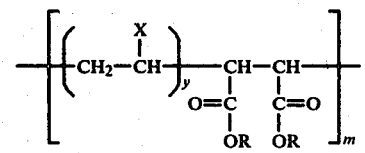

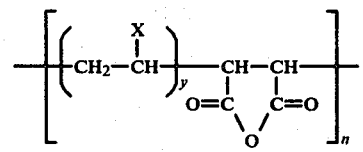

wherein X equals hydrogen, alkyl of 1 to about 30 carbon atoms, phenyl,

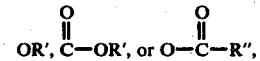

wherein R' is hydrogen or alkyl of 1 to about 30 carbon atoms, R" is alkyl of 1 to about 30 carbon atoms; R is hydrogen or substituted or unsubstituted alkyl or alkyl ethers of about 8 to about 30 carbon atoms, wherein at least one R is said alkyl, y is an integer of 1–5, and the sum of m and n are such that the polymer has a molecular weight of about 1000 to 100,000; the molar ratio of m:n being respectively about 50:50 to about 100:0.

20 Claims, No Drawings

PROCESS FOR INHIBITING FOAMING UTILIZING MALEIC ESTER COPOLYMER BASED DEFOAMERS, AND DEFOAMED COMPOSITIONS

BACKGROUND OF THE INVENTION

1. Field of the Invention

This invention relates to compositions useful in defoaming aqueous mixtures, particularly pulp liquor.

2. Description of the Prior Art

It is known to prepare defoamer compositions for aqueous liquids which must contain both an oil-soluble and oil-insoluble, solid organic polymer from U.S. Pat. No. 3,793,223. In this patent there is disclosed the use of a copolymer of vinyl acetate and fumaric acid esterified with a tallow alcohol and containing excess vinyl acetate but there is no teaching that such a polymer is useful alone or in combination with a mineral oil as a defoamer. In U.S. Pat. No. 3,730,894, there is disclosed a process for inhibiting foaming in a liquid system containing water and a hydrocarbon utilizing as a defoamer a solid, particulate, insoluble material such as a copolymer of vinyl stearate and maleic anhydride but there is no indication that the alkyl esters thereof are useful as defoamers. Mineral oil compositions containing esterified copolymers of α-β-unsaturated polybasic acids with vinyl ethers are disclosed in U.S. Pat. No. 2,704,277 as having lower pour points and improved viscosity indexes; such mineral oil compositions being useful as lubricants. Esterified copolymers of maleic anhydride and a vinyl ether are disclosed in U.S. Pat. No. 2,866,775 for use as pressure-sensitive adhesives.

SUMMARY OF THE INVENTION

There are disclosed mineral oil-polymer compositions useful as defoamers, particularly for defoaming applications in the manufacture of pulp and paper. The useful polymer compositions of the invention are mineral oil soluble and consist of alkyl esters of a maleic compound and a monoethylenically unsaturated monomer which is copolymerizable therewith. Additionally, such defoamer compositions can contain an effective amount of a surfactant capable of dispersing said mineral oil-polymer composition in aqueous media and thus serving as a spreading agent.

Preferably said mineral oil soluble polymer is a half alkyl ester or partial half alkyl ester having about 8 to about 30 carbon atoms in the alkyl chain. Said polymers are prepared by reacting a monohydroxyalcohol with a polymer obtained by reacting a maleic compound and a monoethylenically unsaturated monomer, for instance, the reaction product of equal moles of vinylmethyl ether and maleic anhydride.

DESCRIPTION OF THE PREFERRED EMBODIMENTS

The defoamer compositions of the invention comprise a mineral oil and a mineral oil-soluble polymer which is an alkyl ester of a maleic compound and a monoethylenically unsaturated monomer copolymerizable therewith. The mineral oil-soluble polymer is generally present in the proportion of about 5 to about 50 percent by weight, preferably about 5 to about 20 percent by weight based upon the total weight of said defoamer compositions.

THE LIQUID MINERAL OIL VEHICLE

The mineral oil vehicle for the defoamers of the invention can be any liquid aliphatic, alicyclic, cycloaliphatic, aromatic hydrocarbon which is a liquid at room temperature and atmospheric pressure. Such liquids have a viscosity of about 30 to about 400 SUS (Saybolt Universal Seconds) at 100° F., a minimum boiling point of at least 150° F. and an average of about 6 to about 25 carbon atoms in the molecule. Suitable hydrocarbons include hexane, heptane, octane, mineral seal oil, Stoddard solvent, petroleum naphtha, benzene, toluene, xylene, paraffinic mineral oil, naphthenic mineral oil, and the like. If desired, mixtures of two or more hydrocarbons can be used.

THE MALEIC COMPOUND

The term "maleic compound" used herein refers to maleic acid and maleic anhydride, preferably the maleic compound of the invention is maleic anhydride. The term "maleic anhydride" identifies anhydrides having the formula:

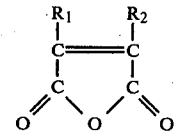

$R_1$ and $R_2$ are selected from the group of hydrogen, alkyl, aryl, and arylalkyl radicals containing up to 8 carbon atoms and halogen. Thus, maleic anhydride, methylmaleic anhydride, phenylmaleic anhydride, dimethylmaleic anhydride, and chloromaleic anhydride are particularly contemplated. Maleic anhydride is preferred.

THE MONOETHYLENICALLY UNSATURATED MONOMER

The monoethylenically unsaturated monomer which is copolymerizable with said maleic compound to make the copolymers of the invention, which are subsequently esterified, can be an allyl or vinyl ester or ether having monomeric units of the formula:

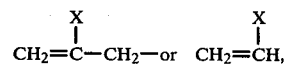

wherein X equals OR' and R' is alkyl of 1 to about 30 carbon atoms. The ether material can be either chemically pure or a technical grade and can consist of a single ether or a mixture thereof of the vinyl or allyl type or mixtures of both of said types. The ether can be derived from mono- or polyhydric alcohols of both the aliphatic and aromatic series. The allyl ethers can be conventionally prepared by reacting the sodium alcoholate with allylbromide while the vinyl ethers can be obtained by reacting the particular alcohol with acetylene in accordance with the well-known Reppe process. Specific examples of suitable ethers are vinylmethyl ether, allylmethyl ether, vinyloctyl ether, allyllauryl ether, allyltetradecyl ether, vinyloctadecyl ether, vinyl or allylphenyl ether, vinyl or allylbenzyl ether, divinyl or diallyl ethers and allyl or vinyl ethers of polyhydric alcohols such as ethylene glycol.

The monoethylenically unsaturated monomer can also be a vinyl or allyl ester wherein X in the above formula represents

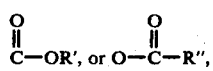

wherein R' is hydrogen or alkyl of 1 to about 30 carbon atoms and R" is alkyl of 1 to about 30 carbon atoms. The vinyl or allyl ester material can be either chemically pure or a technical grade and can consist of either a single ester or a mixture of esters of the vinyl or allyl type or both. The ester can be derived from the reaction of a particular carboxylic acid or mineral acid with acetylene. Specific examples of vinyl compounds made in this way are vinyl acetate, vinyl laurate, vinyl stearate, vinyl myristate, vinyl benzoate, vinyl propionate, vinyl butyrate, and vinyl formate.

The monoethylenically unsaturated vinyl compound can be a vinyl aromatic monomer, especially styrene and vinyl toluene, but other substituted styrenes can be used such as ring-alkylated styrene compounds such as the vinyl xylenes and para-isopropyl styrene. Halogen-substituted styrenes can also be used in which up to 5 of the nuclear hydrogen atoms are replaced by chlorine, fluorine, or other halogen.

The monoethylenically unsaturated monomer can also be an olefin having 2 to 32 carbon atoms. Representative examples of suitable olefins are: ethylene, propylene, 1-butene, 1-pentene, 1-hexane, 1-heptene, 1-octene, 1-nonene, 1-decene, and octadecene.

PREPARATION OF THE COPOLYMER INTERMEDIATES

Copolymers of vinyl ethers, styrene and olefins with maleic anhydride are well known. These monomers possess a very strong tendency to polymerize in alternating monomer units, when the monomers are present in substantially a 1:1 mole ratio. Generally, the copolymerization reaction is exothermic with the rate of reaction increasing with increasing temperature. Thus, from the standpoint of safety, the art has generally utilized solution-precipitation polymerization processes in which the exothermic nature of the reaction can be adequately controlled. A mixture of one mole of monoethylenically unsaturated monomer per mole of maleic compound is preferred in the preparation of the copolymer intermediates. However, ratios of 1 to about 5 moles of ethylenically unsaturated monomer per mole of maleic compound are useful.

The polymer intermediates and alkyl esters thereof generally have a molecular weight of about 1000 to about 100,000, preferably about 5000 to about 50,000, and most preferably about 5000 to about 20,000, number average molecular weight as determined by Osmotic techniques in 2-butenone as solvent.

The effect of molecular weight of the polymer intermediates on the properties of the defoamer compositions of the invention is primarily one of viscosity, namely, where higher molecular weight copolymer intermediates are utilized in the preparation of the half esters or partial half esters of the invention, the viscosity upon dissolution in mineral oil is increased. The preferred copolymer intermediates are methylvinyl ether-maleic anhydride copolymers, styrene-maleic anhydride copolymers, and octadecene-maleic anhydride copolymers having a 1:1 mole ratio.

More specifically, the copolymer intermediates of the invention are prepared by methods well known to those skilled in the art, for instance, by first producing a solvent solution containing dissolved ethylenically unsaturated monomer and a peroxide polymerization catalyst such as benzoyl peroxide. The solution so obtained is then filtered if necessary and the monoethylenically unsaturated monomer, for instance, styrene or methyl vinyl ether, is slowly added with mixing at a rate of addition such that the heat of reaction is suitably controlled. Various other organic peroxides such as dilauryl peroxide, ditertiarybutyl peroxide, diacetyl peroxide, acetyl benzoyl peroxide, tertiarybutyl hydroperoxide, cumene hydroperoxide, etc., can be used as well as other free radical generating catalysts such as azo compounds illustrated by azo-diisobutyronitrile. Concentrated solutions of hydrogen peroxide are also useful as well as catalysts such as acetone peroxide which provide free radical activity and stability at higher temperatures.

*The alkyl half esters or partial half esters of the reaction product of the maleic compound with the monoethylenically unsaturated monomer.*

The copolymer intermediates of the invention contain a plurality of maleic compound groups, for instance, maleic anhydride groups which are subject to esterification; each anhydride group being capable of forming a pair of ester groups upon reaction with a monohydric aliphatic alcohol. The extent of the desired esterification can be expressed as a percentage of half esterification. Thus, the esterification of one equivalent of anhydride in the copolymer with 0.5 mole of a monohydric alcohol provides a 50 percent half-esterification. Similar esterification with one mole of a monohydric alcohol provides a 100 percent half-esterification, i.e., 1 mole of said alcohol per carboxylic acid group. The esters of the invention are preferably partial or half esters of the reaction product of the maleic compound and the monoethylenically unsaturated monomer as generically described by the structural formula:

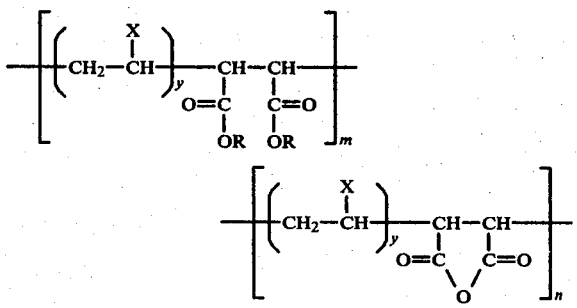

wherein X equals hydrogen, alkyl of 1 to about 30 carbon atoms, phenyl, OR',

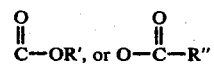

wherein R' is hydrogen or alkyl of 1 to about 30 carbon atoms, R" is alkyl of 1 to about 30 carbon atoms; R is hydrogen or substituted or unsubstituted alkyl or alkyl ethers of about 8 to about 30 carbon atoms, wherein at least one R is said alkyl, y is an integer of 1–5, and the sum of m and n are such that the polymer has a molecular weight of about 1000 to 100,000; the molar ratio of m:n being respectively about 50:50 to about 100:0. No more than half esterification with a suitable monohydric alcohol is required to confer mineral oil solubility characteristics on the ester and additional esterification to provide up to the full diester is therefore unnecessary. This would also add to the cost of preparing the ester.

When the defoamers of the invention are used in an aqueous media, the mineral oil-soluble polymer component is hydrolyzed so as to convert all or a portion thereof of the anhydride group-containing portion of the polymer to the free acid form. Thus, the oil-soluble polymer can be generically described by the structural formula:

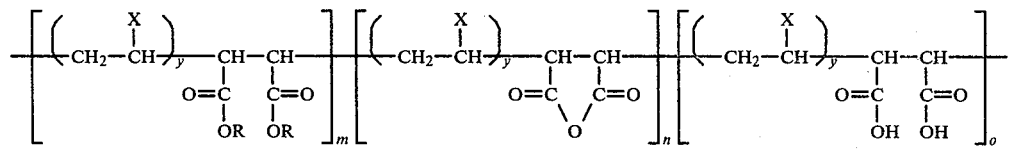

wherein X represents hydrogen, alkyl of 1 to about 30 carbon atoms, phenyl, OR',

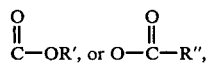

wherein R' is hydrogen or an alkyl group having 1 to about 30 carbon atoms; R" is an alkyl group of 1 to about 30 carbon atoms; R is hydrogen or an unsubstituted or substituted alkyl group having about 8 to about 30 carbon atoms; wherein at least one R is said alkyl; y is an integer of 1–5; the sum of m, n, and o units is such that the polymer has a molecular weight of about 1000 to about 100,000, and the proportion of m:n:o units is such that the sum of m and o units represents a major proportion thereof and the mole percentage of m, n and o units is such that n and o are 0 to 25, and m is 50 to 100.

The particular alcohol used to esterify the copolymer intermediates of the invention has an important effect upon the mineral oil solubility of the final ester produced. Thus, adequate oil solubility can be obtained by esterifying up to half-esterification utilizing a monohydric alkyl alcohol having about 8 to about 30 carbon atoms, preferably about 18 to about 25 carbon atoms, in the chain. While other monohydric alcohols, including aromatic monohydric alcohols, can be used, it is preferred to employ aliphatic alcohols. Polyether alcohols containing no more than one hydroxyl group are also useful, such as the monoethyl and monobutylether polyoxyalkylene glycols illustrated by methoxy polyethylene glycol.

Among the aliphatic monohydric alcohols containing about 8 to about 30 carbon atoms in the aliphatic carbon chain and carrying a single hydroxyl group, suitable representative alcohols are the primary, secondary, and tertiary alcohols including straight-chain and branched-chain alcohols as well as cyclic alcohols. Representative monohydric alcohols which are useful in the esterification are n-octyl alcohol, n-decyl alcohol, n-dodecyl alcohol (lauryl), n-tetradecyl alcohol (myristyl), n-hexadecyl alcohol (cetyl), n-octadecyl alcohol, benzyl alcohol, α-phenylethyl alcohol, β-phenylethyl alcohol, diphenyl carbonol, triphenyl carbonol, tetrahydrofurfuryl alcohol, Cellosolve, phenylCellosolve, butoxyethyl propanol, and 2-ethylhexanol.

The monohydric alcohol can also contain halogen, nitrogen, sulfur, or phosphorus atoms. Thus, halogenated derivatives can be used as, for instance, chlorinated or fluorinated octanol. Sulfur-containing monohydric alcohols can also be used as illustrated by thioethers such as 2-ethylhexyl sulfide. Phosphorus-containing monohydric alcohols which can be used are illustrated by diethylmonooctenyl phosphate. While saturated monohydric alcohols are preferred, saturation is not an essential requirement. Thus, unsaturated alcohols can be used such as oleyl alcohol and linoleyl alcohol.

In the preparation of the esters of the copolymer intermediates of the invention, the monohydric alcohol and the copolymer intermediate are combined under ordinary esterification conditions. For example, the reactants can be heated at xylene reflux temperature in the presence of concentrated sulfuric acid or toluene sulfonic acid as a catalyst. A suitable alcohol as above described can be used or a mixture of alcohols in the esterification. Generally, even though no more than half esterification is generally desired, a molar excess of the desired alcohol is added to the solution together with a catalyst. Catalysts such as para-toluene sulfonic acid, benzene sulfonic acid, sulfuric acid and many others are satisfactory to promote the esterification reaction.

Alternatively, the reaction can be conducted by dispersing the copolymer intermediates of the invention in mineral oil and adding the desired alcohol. Upon heating, the oil-soluble ester is formed. The esterification reaction can be terminated at any point by cooling the reaction mass. Recovery of the ester from the solvent used as reaction medium can be accomplished by conventional means. Recovery is unnecessary where the reaction medium is the desired mineral oil intended as one of the components of the defoamer compositions of the invention.

OPTIONAL ADDITIVES

As is conventional in the defoamer art, a surfactant is generally added to a defoamer composition in an effective amount sufficient to disperse the defoamer composition as discrete particles in the aqueous medium in which it is to function. Preferably, said surfactant is present generally in the proportion of about 1 to about 20 percent by weight, preferably about 5 to about 20 percent by weight, based upon the total weight of said defoamer composition. Thus, the mineral oil-ester composition of the invention can be made more readily dispersible in aqueous media and also more effective as a defoamer by the incorporation of a surfactant or wetting agent. Generally, the surfactant utilized has a measure of mineral oil solubility and is preferably selected from at least one of compositions such as alkali metal stearates, such as lithium stearate, and polyoxyalkylene glycols. Said glycols desirably have a suitable hydrophobic component of the molecule which confers mineral oil solubility or at least mineral oil dispersibility. Said polyoxyalkylene glycols are well known in the surfactant art and generally have a molecular weight of about 100 to about 5000.

The surfactant, which can be optionally utilized as a component of the defoamer compositions of the invention, generally can be selected from any of the various types of surfactants including anionic, cationic, and non-ionic surfactants. Examples of suitable anionic surfactants are fatty acids containing about 12 to about 22 carbon atoms and soaps of the fatty acids. Other suitable anionic surfactants include alkali metal and alkaline earth metal salts of alkyl-aryl sulfonic acids and sulfated or sulfonated oils. Suitable cationic surfactants include salts of long chain primary, secondary, or tertiary amines and quaternary salts. Suitable non-ionic surfactants include the above polyoxyalkylene glycols as well as alkoxylated alkyl substituted phenols, condensation products of higher fatty alcohols with ethylene oxide, condensation products of fatty acid amides with ethylene oxide, polyethylene glycol esters of long chain fatty acids, ethylene oxide condensates of a polyhydric alcohol, partial higher fatty acid esters, long chain polyglycols in which one hydroxyl group is esterified with a higher fatty acid and the other hydroxyl group is esterified with a low molecular weight alcohol. Additional representative useful surfactants are disclosed in U.S. Pat. No. 4,024,072, incorporated herein by reference.

PULP MILL APPLICATIONS OF THE DEFOAMERS OF THE INVENTION

The defoamer compositions of the invention are effective defoamer compositions in aqueous media and are particularly effective for use in pulp mill applications, more specifically, in the defoaming of kraft pulp mill black liquor. However, the defoamer compositions of the invention are useful in defoaming a wide variety of aqueous mixtures of materials exhibiting surfactant or wetting properties in aqueous media. For instance, aqueous solutions of casein or partially hydrolyzed polyvinyl alcohol or emulsions of synthetic polymers prepared utilizing said casein or polyvinyl alcohol as emulsifiers such as polyvinyl acetate or neoprene emulsions. The defoamer compositions of the invention can be applied to said black liquor in a conventional manner, typically by the addition thereof of an effective foam-inhibiting amount directly into the black liquor required to be defoamed. Alternatively, a part of the black liquor can be removed from the main stream, an effective foam-inhibiting amount of the defoamer composition of the invention dispersed therein, and the removed black liquor can be recycled to the main black liquor stream. Under certain circumstances, it is desirable to provide for the continuous addition of the defoamer compositions to the black liquor by suitable metering equipment. The defoamer compositions of the invention are particularly suited for this procedure since they require no prior predilution or predispersion. Generally, said defoamer compositions are used in aqueous systems at a concentration of about 5 to about 200 parts by weight per million parts (ppm), preferably about 25 to about 100 ppm by weight and most preferably about 40 to about 80 ppm by weight.

The defoamer compositions of the invention are particularly useful in that they provide a balanced blend of foam-breaking activity ("quick kill") and long term foam-inhibiting activity. Because no predilution or dispersion is required, there is less bulk of defoamer composition required to be transported and handled in the paper mill. Because of the mineral oil solubility characteristics of the ester defoamers of the instant invention, these defoamers are particularly advantageous over competitive products based upon ethylene diamine bis-stearyl amide which is characterized by extremely low solubility in practically all solvents. The defoamer compositions of the invention thus avoid the undesirable agglomeration characteristics of the latter defoamers wherein agglomeration can occur on the wire of a paper machine when these defoamers are used in the processing of the pulp. In addition, because the ester compositions of the invention are soluble in mineral oil carriers, the defoamer compositions of the invention are not prone to storage stability problems resulting in phase separation, viscosity change, etc., upon extended storage as is the case with certain prior art products.

LABORATORY TEST METHODS FOR DETERMINATION OF DEFOAMER EFFECTIVENESS

Laboratory test methods have been developed which are capable of predicting the effectiveness of a defoamer under commercial conditions. A test method described in a Technical Bulletin CP-6679 782 entitled "Dynamic Defoamer Demonstration Kit" of the BASF Wyandotte Corporation, Wyandotte, Mich., incorporated herein by reference, fully describes the operation of the laboratory test methods utilized to evaluate the defoamer compositions of the invention. In this method of defoamer evaluation, a graduated glass tube partially filled with 500 milliliters of an aqueous liquid to be defoamed is connected to a pump which recirculates the liquid, the recirculated liquid entering the top of the glass tube partially filled with liquid. Foam is created at the top of the glass tube and permitted to rise to a height of 12 inches. Thereafter, a drop of defoamer under test is added (about 50 parts per million by weight concentration) by means of an eye dropper. At the time of addition, a stop watch is started and the time is noted during which the foam reaches its lowest point. This time in seconds is called "quick kill time". As the pump continues to recirculate the liquid, foam height will again rise, eventually building to a height of 12 inches. The time subsequent to addition of defoamer during which the foam height rises to 12 inches is recorded as "the persistence time" of the defoamer.

The following examples illustrate the various aspects of the invention. Where not otherwise specified throughout this specification and claims, temperatures are given in degrees centigrade and parts, percentages, and proportions are by weight.

EXAMPLE 1

This example illustrates the preparation of the alkyl ester of a copolymer of vinyl methyl ether and maleic anhydride sold under the trademark "GANTREZ AN 119" by the GAF Corporation. It is understood that this copolymer has a number average molecular weight of about 20,000 as determined by osmotic techniques, as previously described herein.

Utilizing 15.6 grams (0.1 mole) of said maleic anhydride-methyl vinyl ether copolymer and 62.2 grams (0.1 mole) on the basis of a hydroxyl number of 90 of a fatty alcohol having an average carbon chain length of 20 sold under the trademark "EPAL 20 PLUS" by the Ethyl Corporation, and 0.5 grams of 98 percent sulfuric acid mixed in an open beaker and heated at 150° C. for one hour. A light brown solid having a solidification point of 52° C. was obtained.

EXAMPLE 2

A defoamer composition of the invention was prepared by blending 80 percent by weight of a mineral oil sold under the trademark "SHELLFLEX 212" with 10 percent by weight of the ester prepared in Example 1 and 10 percent by weight of a base block polymer prepared by first adding propylene oxide to the two hydroxy groups of a propylene glycol nucleus and then adding ethylene oxide to both ends of this hydrophobic base. Such a block polymer product is sold under the trademark "PLURONIC® L121" by the BASF Wyandotte Corporation. It is characterized as having a typical molecular weight of the polyoxypropylene hydrophobic base of 4000 and 10 percent by weight of polyoxyethylene hydrophilic units in the total molecule. The defoamer composition prepared was characterized as a hazy liquid.

EXAMPLE 3

Utilizing the dynamic defoamer test method described above, the defoamer of Example 2 was evaluated as a defoamer for kraft process liquor at a temperature of 180° F. The effect of the addition of 50 parts per million of the defoamer of Example 2 on the height of the generated foam resulted in a "quick kill" time of about 10 seconds wherein the foam height was reduced from 12 inches to about 3 inches. The "persistence time" was unexpectedly long as compared to the commercially available defoamer of Example 4, the defoaming effect lasting for a period of 600 seconds.

EXAMPLE 4 (CONTROL)

The dynamic defoamer test method described herein was utilized to evaluate the effectiveness of a commercially available defoamer sold as Drew L-900 by the Drew Chemical Company which is utilized extensively for the defoaming of kraft pulp liquor. This material is based upon ethylene diamine bis-stearyl amide. Test results indicate a quick kill time of about 7 seconds and a persistence time of 100 seconds.

EXAMPLE 5

Utilizing the ester prepared in Example 1, a defoamer composition of invention was prepared by blending 85 percent by weight of mineral oil sold under the trademark "SHELLFLEX 212", 10 percent by weight of the ester of Example 1, and 5 percent by weight of lithium stearate. Evaluation as a defoamer utilizing the dynamic defoamer test described above indicates excellent quick kill and persistence properties.

EXAMPLE 6

This example illustrates the preparation of an ester of a 16 carbon chain monoalcohol and a vinyl methyl ether-maleic anhydride copolymer.

To 15.6 grams (0.1 mole) of a vinyl methyl ether-maleic anhydride copolymer sold under the trademark "GANTREZ AN119" there were added 24.2 grams (0.1 mole) of a 16 carbon chain monohydric alcohol sold under the trademark "ALFOL C-16". There was mixed therewith 0.2 gram of paratoluene sulfonic acid and the mixture was heated in a beaker at 165° C. for two and a half hours on a hot plate utilizing a magnetic stirrer device. A clear brown, waxy liquid soluble in mineral oil was obtained.

EXAMPLE 7

This example illustrates the preparation of a 10 carbon monoaliphatic alcohol ester of a vinyl methyl ether-maleic anhydride copolymer.

To 15.6 grams of a copolymer sold under the trademark "GANTREZ AN119" there were added 16.0 grams (0.1 mole) of isodecanol and 0.2 gram of para-toluene sulfonic acid. The materials were mixed in a beaker and heated at 160° C. for four hours on a hot plate utilizing a magnetic stirrer and an oil bath. Thereafter a clear, brown solid was obtained which was soluble in mineral oil and useful as a defoamer for kraft pulp liquor.

EXAMPLE 8

This example illustrates the preparation of the ester of a maleic anhydride-octadecene polymer sold under the trademark "POLYANHYDRIDE RESIN PA-18" by the Gulf Oil and Chemical Company.

To 35 grams (0.1 mole) of said copolymer there was added 62.2 grams (0.1 mole) of a mixture averaging 20 carbons in the chain of monohydric alcohols sold under the trademark "EPAL 20 PLUS" and 0.5 gram of a 98 percent sulfuric acid. The materials were mixed in a flask and heated at 150° C. for one hour using a glycerol bath for heating. Thereafter, a dark brown waxy liquid characterized as extremely viscous at room temperature was obtained suitable for use as a defoamer for kraft pulp liquor.

EXAMPLE 9

This example illustrates the preparation of the half ester of a styrene maleic anhydride copolymer having a 2:1 molar ratio of styrene to maleic anhydride and sold under the trademark "ARCO 2625 A". To 50.9 grams (0.1 mole) of said resin there was added 62.2 grams (0.1 mole) of a monohydric aliphatic alcohol having an average chain length of about 20 carbon atoms and sold under the trademark "EPAL 20" and 0.5 gram of toluene sulfonic acid. The materials were mixed in a beaker and heated at a temperature of 100° to 107° C. for a period of three hours utilizing a magnetic stirrer and a hot plate for heating. A homogeneous, viscous liquid was obtained useful as a defoamer.

EXAMPLES 10-17

Example 2 was repeated substituting for the surfactant utilized therein, in the preparation of successive defoamer compositions of the invention, an equal amount of zinc stearate, aluminum stearate, calcium stearate, magnesium stearate, sodium stearate, sorbitan monooleate, nonylphenol ethoxylated with 10 moles of ethylene oxide, and a sulfosuccinate ester sold under the trademark "AEROSOL TR-70". When these defoamer compositions were successively tested in accordance with the above described procedure of the dynamic defoamer test, and further illustrated in Example 3, each of the defoamer compositions exhibited an effective "quick kill" and "persistence time".

While this invention has been described with reference to certain specific embodiments, it will be recognized by those skilled in the art that many variations are possible without departing from the scope and spirit of the invention and it will be understood that it is intended to cover all changes and modifications of the invention disclosed for the purposes of illustration which do not constitute departures from the spirit and scope of the invention.

The embodiments of the invention in which an exclusive property or privilege is claimed are defined as follows:

1. A process for inhibiting foaming in a liquid system containing water comprising adding thereto an effective foam inhibiting amount of a defoamer composition consisting of a mineral oil and about 5 to about 50 percent by weight based upon the total weight of said composition of a mineral oil-soluble polymer of the formula:

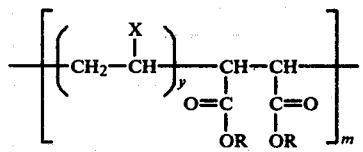

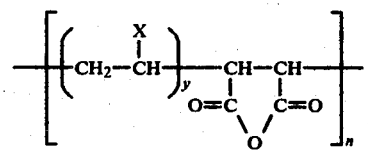

wherein X equals hydrogen, alkyl of 1 to about 30 carbon atoms, phenyl, OR',

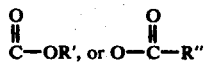

wherein R' is hydrogen or alkyl of 1 to about 30 carbon atoms, R" is alkyl of 1 to about 30 carbon atoms; R is hydrogen or substituted or unsubstituted alkyl or alkyl ethers of about 8 to about 30 carbon atoms wherein at least one R is said alkyl, y is an integer of 1-5, and the sum of m and n are such that the polymer has a molecular weight of about 1000 to 100,000; the molar ratio of m:n being respectively about 50:50 to about 100:0.

2. A process for inhibiting foaming in a liquid system containing water comprising adding thereto an effective foam inhibiting amount of a defoamer composition consisting of an effective amount of a surfactant to impart water dispersibility thereto, a mineral oil, and about 5 to about 50 percent by weight based upon the total weight of said composition of a mineral oil-soluble polymer of the formula:

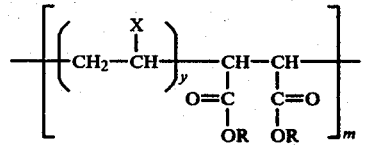

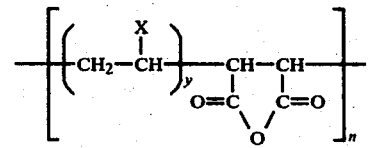

wherein X equals hydrogen, alkyl of 1 to about 30 carbon atoms, phenyl, OR',

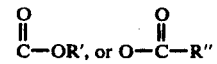

wherein R' is hydrogen or alkyl of 1 to about 30 carbon atoms, R" is alkyl of 1 to about 30 carbon atoms; R is hydrogen or substituted or unsubstituted alkyl or alkyl ethers of about 8 to about 30 carbon atoms wherein at least one R is said alkyl, y is an integer of 1-5, and the sum of m and n are such that the polymer has a molecular weight of about 1000 to 100,000; the molar ratio of m:n being respectively about 50:50 to about 100:0.

3. The process of claim 2 wherein said surfactant is present in the proportion of about 1 to about 20 percent by weight based upon the total weight of said defoamer composition.

4. The process of claim 3 wherein said surfactant is selected from the group consisting of at least one of the alkali metal stearates and polyoxyalkylene glycols having a molecular weight of about 100 to about 5000.

5. The process of claim 3 wherein said polymer is a half alkyl ester derived from the reaction of a mixture of a maleic compound and a monoethylenically unsaturated monomer copolymerizable therewith, said mixture containing one mole of said monomer per mole of maleic compound.

6. The process of claim 5 wherein said monoethylenically unsaturated monomer is styrene and said maleic compound is maleic anhydride.

7. The process of claim 5 wherein said monoethylenically unsaturated monomer is methylvinyl ether and said maleic compound is maleic anhydride.

8. The process of claim 7 wherein R is alkyl of about 18 to about 25 carbon atoms and said liquid system is pulp mill black liquor.

9. The process of claim 5 wherein said monoethylenically unsaturated monomer is octadecene and said maleic compound is maleic anhydride.

10. The process of claim 3 wherein said polymer is derived from the reaction of a mixture of a maleic compound and a monoethylenically unsaturated monomer wherein said monomer is used in a proportion to provide five moles thereof per mole of maleic compound.

11. A defoamed composition comprising a liquid system containing water and the defoamer composition of claim 1 dispersed therein as discrete particles present in an effective foam-inhibiting amount.

12. The composition of claim 11 wherein said liquid system is a mixture of water and a surfactant.

13. The composition of claim 11 wherein said liquid system is pulp mill black liquor.

14. A dispersion in an aqueous medium comprising effective foam-inhibiting amount of a defoamer consisting of a mixture of a mineral oil and about 5 to about 50 percent by weight based upon the total weight of said mineral oil and said polymer of a mineral oil-soluble polymer of the formula:

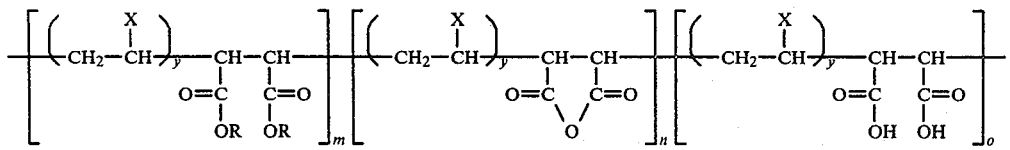

wherein X represents hydrogen, alkyl of 1 to about 30 carbon atoms, phenyl, OR', $$\overset{O}{\underset{\|}{C}}-OR', \text{ or } O-\overset{O}{\underset{\|}{C}}-R''$$

wherein R' is hydrogen or an alkyl group having 1 to about 30 carbon atoms; R" is an alkyl group of 1 to about 30 carbon atoms; R is hydrogen or an unsubstituted or substituted alkyl group having about 8 to about 30 carbon atoms and at least one R is said alkyl group; y is an integer of 1-5; the sum of m, n, and o units is such that the sum of m and o units represents a major proportion thereof and the mole percentage of m, n and o units is such that n and o are each 0 to 25, and m is 50 to 100.

15. A dispersion in an aqueous medium comprising an effective foam-inhibiting amount of a defoamer consisting of an effective amount of a surfactant to impart water dispersibility thereto, a mixture of a mineral oil, and about 5 to about 50 percent by weight based upon the total weight of said mineral oil and said polymer of a mineral oil-soluble polymer of the formula:

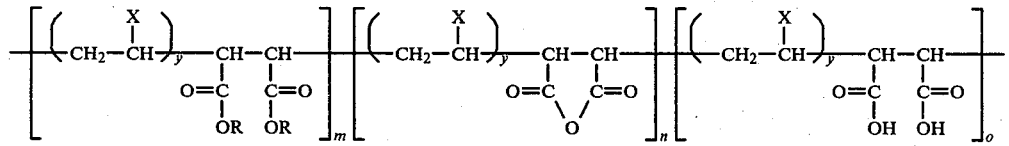

wherein X represents hydrogen, alkyl of 1 to about 30 carbon atoms, phenyl, OR', $$\overset{O}{\underset{\|}{C}}-OR', \text{ or } O-\overset{O}{\underset{\|}{C}}-R''$$

wherein R' is hydrogen or an alkyl group having 1 to about 30 carbon atoms; R" is an alkyl group of 1 to about 30 carbon atoms; R is hydrogen or an unsubstituted or substituted alkyl group having about 8 to about 30 carbon atoms and at least one R is said alkyl group; y is an integer of 1-5; the sum of m, n, and o units is such that the sum of m and o units represents a major proportion thereof and the mole percentage of m, n and o units is such that n and o are each 0 to 25, and m is 50 to 100.

16. The composition of claim 15 wherein said polymer is an alkyl half ester.

17. The composition of claim 16 wherein said polymer contains 5 moles of said monoethylenically unsaturated monomer per mole of maleic compound.

18. The composition of claim 16 wherein said polymer contains one mole of said monoethylenically unsaturated monomer per mole of maleic compound.

19. The composition of claim 16 wherein said monoethylenically unsaturated monomer is selected from the group consisting of styrene, methylvinyl ether, octadecene, and mixtures thereof.

20. The composition of claim 19 wherein said aqueous medium is pulp mill black liquor.

* * * * *